R. M. McGEE.
AUTOMATIC STREET CALLING DEVICE.
APPLICATION FILED MAY 18, 1909.

972,397.

Patented Oct. 11, 1910.
4 SHEETS—SHEET 1.

WITNESSES:
A.D. Knight
J.S. Murray

INVENTOR
Richmond M. McGee.
BY John M. Spellman
ATTORNEY

R. M. McGEE.
AUTOMATIC STREET CALLING DEVICE.
APPLICATION FILED MAY 18, 1909.

972,397.

Patented Oct. 11, 1910.
4 SHEETS—SHEET 2.

WITNESSES:
J. S. Murray
Jessie Kirk

INVENTOR
Richmond M. McGee
BY John M. Spillman
ATTORNEY

R. M. McGEE.
AUTOMATIC STREET CALLING DEVICE.
APPLICATION FILED MAY 18, 1909.

972,397.

Patented Oct. 11, 1910.
4 SHEETS—SHEET 3.

WITNESSES:
a.S.Knight
J.S.Murray

INVENTOR
Richmond M. McGee.
BY John M. Spellman
ATTORNEY

R. M. McGEE.
AUTOMATIC STREET CALLING DEVICE.
APPLICATION FILED MAY 18, 1909.

972,397.

Patented Oct. 11, 1910.
4 SHEETS—SHEET 4.

WITNESSES:
J. S. Murray
Jessie Kirk

INVENTOR
Richmond M. McGee
BY
John M. Spellman
ATTORNEY

UNITED STATES PATENT OFFICE.

RICHMOND M. McGEE, OF DALLAS, TEXAS.

AUTOMATIC STREET-CALLING DEVICE.

972,397. Specification of Letters Patent. Patented Oct. 11, 1910.

Application filed May 18, 1909. Serial No. 496,816.

*To all whom it may concern:*

Be it known that I, RICHMOND M. McGEE, citizen of the United States, residing at 104 Vine street, Dallas, in the county of Dallas and State of Texas, have invented certain new and useful Improvements in Automatic Street-Calling Devices, of which the following is a specification.

My invention relates to new and useful improvements in automatic street calling devices for street cars. Its object is to provide a phonographic street calling device applicable to an electric car which will automatically announce each street as the car approaches it.

Another object is to provide such a device as will not only call out the streets but will also automatically cause the name of each street to be conspicuously displayed at the proper time.

A further object is to relieve the car conductor of the responsibility of calling out each street, and to eliminate the possibility of his neglecting this duty by employing a mechanical annunciator for the purpose.

A still further object is to provide a device to be installed on street cars which will successively call out advertisements at regular intervals.

Finally, the object of my invention is to provide a device of the character described, which will be strong, durable, simple and efficient, and comparatively easy to produce, and one in which the various parts will not be likely to get out of working order.

Figure 1:
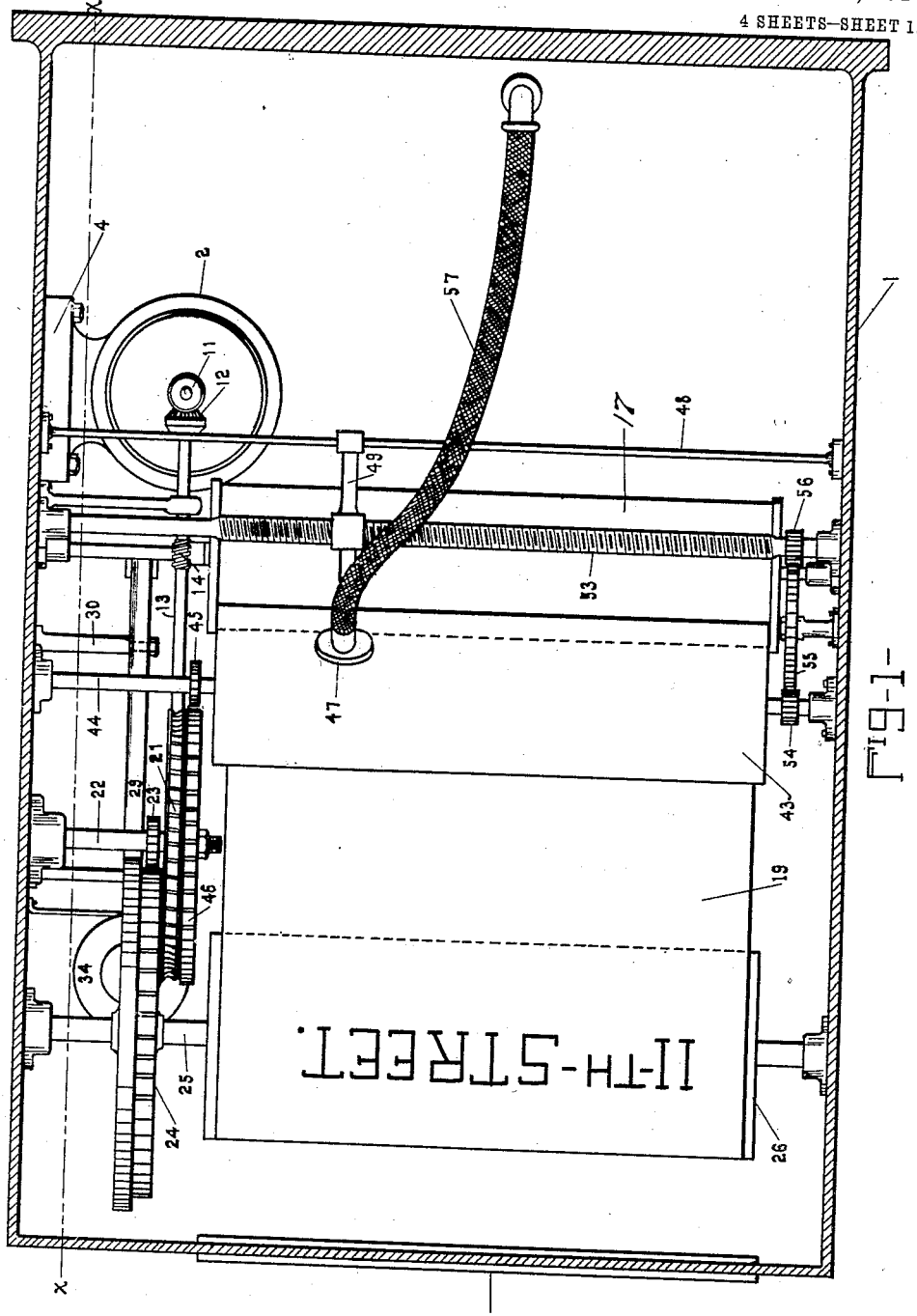
Figure 2:
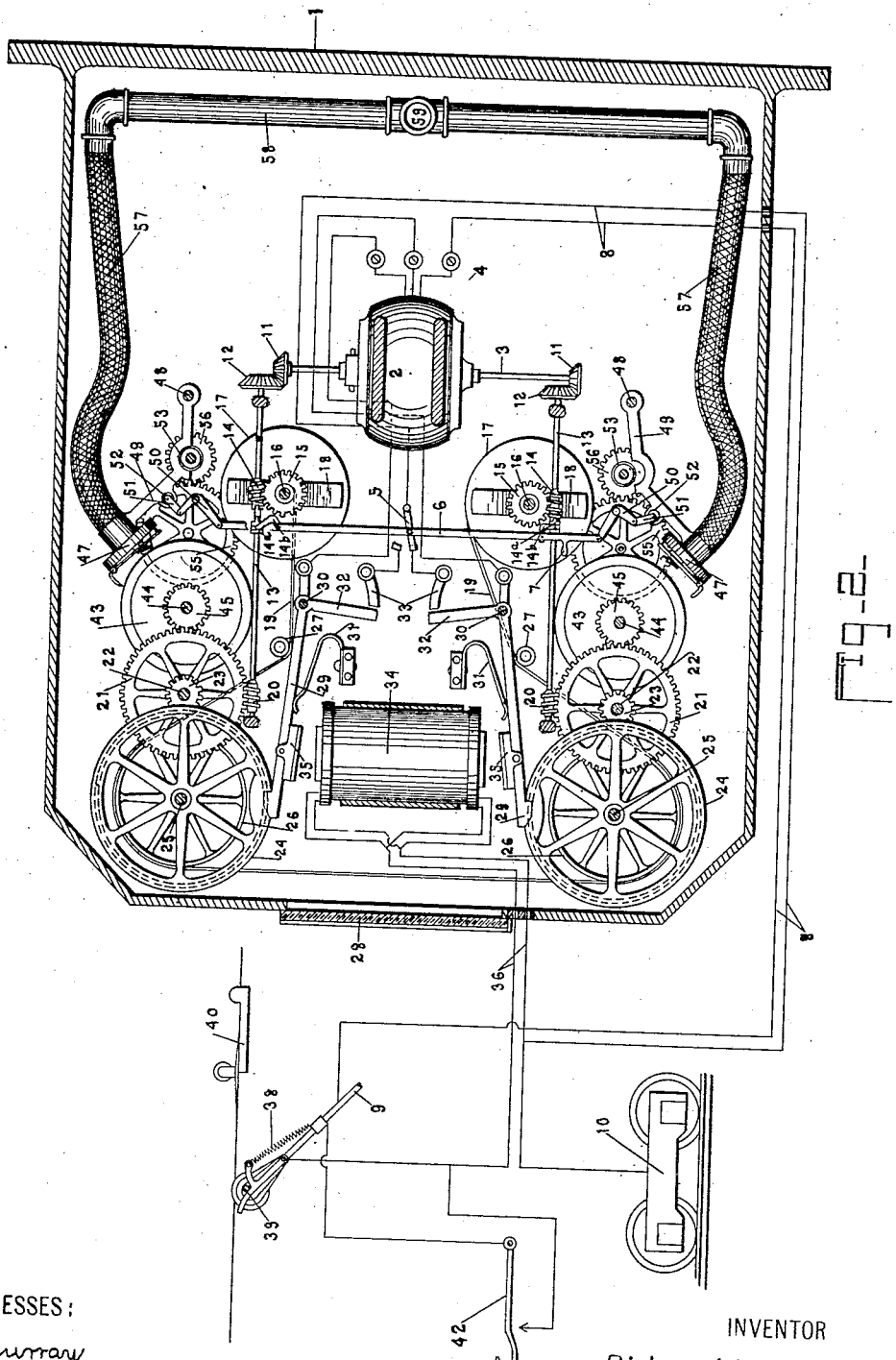
Figure 3:
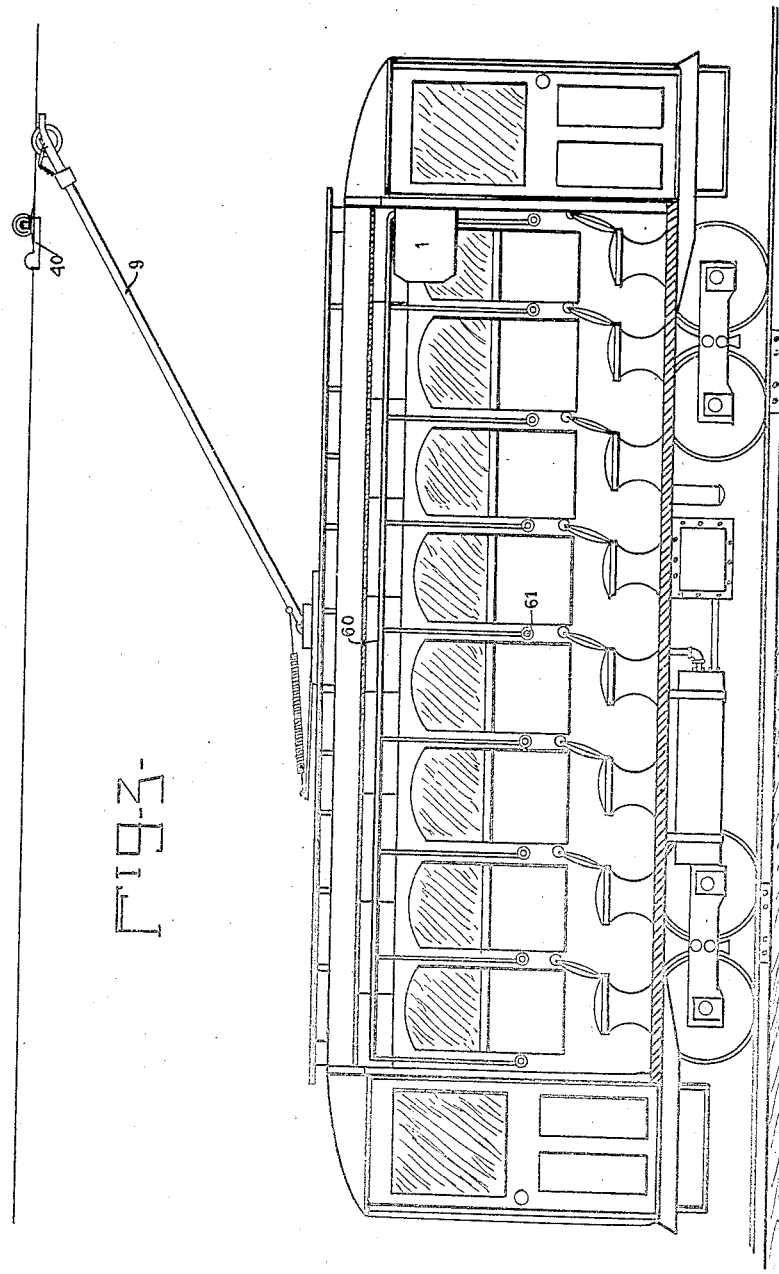
Figure 4:
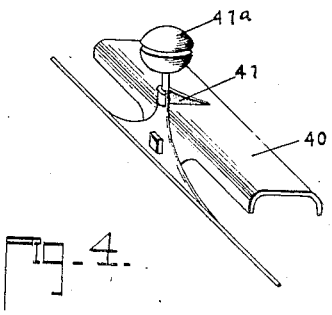
Figure 5:
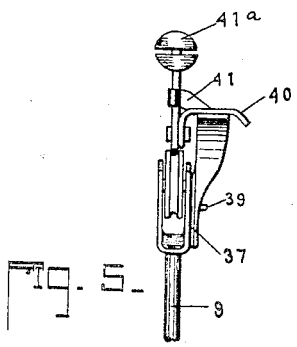
Figure 6:
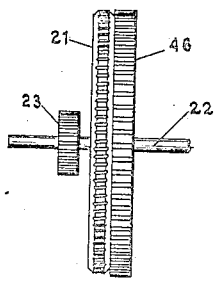
Figure 7:
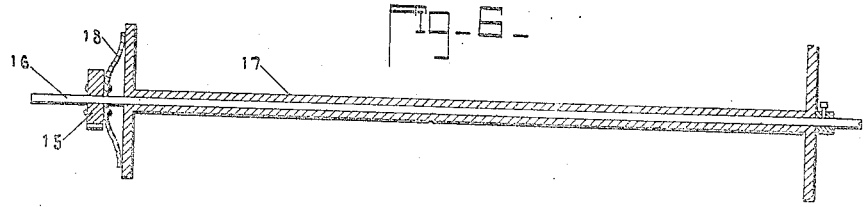
Figure 8:
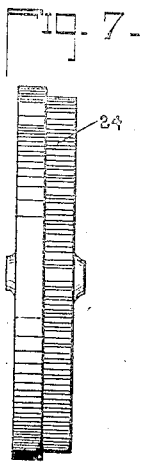

With these and various other objects in view, the invention has relation to certain novel features of construction and operation, an example of which is described in the following specification and illustrated in the accompanying drawing, wherein:

Figure 1 is a bottom view of the operating mechanism of the device, the casing containing the same being shown in section. Fig. 2 is a sectional elevation of the device upon the line $x$—$x$ of Fig. 1, a diagram of the electrical connections being included in the figure. Fig. 3 is a side elevation of a street car with the near side removed to show the street calling device installed within. Fig. 4 is a perspective detail of one of the contact devices which are to be attached to the trolley wire wherever a street name is to be announced. Fig. 5 is a detail end view of the contact maker upon the upper extremity of the trolley pole, showing it in contact with the trolley device illustrated in Fig. 1. Fig. 6 is a side view of a portion of a spindle upon which a spur pinion, worm-wheel and spur-gear are mounted, the use of which will be made clear hereinafter. Fig. 7 is a longitudinal sectional elevation of one of the drums upon which winds a web carrying the names of all the cross streets on the car-line, showing the friction clutch which is used in conjunction with each drum. Fig. 8 is a view showing the face of one of the semi-shrouded gears employed in street caller, whose object will be fully described hereinafter.

Referring now more particularly to the drawings, wherein like numerals of reference designate similar parts in all the figures, the numeral 1 denotes the casing, within which the mechanism of the device is contained. This casing is preferably to be attached in a conspicuous position upon the front of the car. The mechanism is operated by a motor 2, mounted upon a vertical spindle 3 and attached to the side of the casing by feet 4. The motor is so wound and connected up as to permit of its direction of rotation being reversed. The reversing switch 5 controls the direction of rotation, a lever 6, provided with a handle 7 serving to operate the switch. The wires 8 which transmit current to and from the motor are connected one to the trolley-pole 9, and the other to the car trucks 10, this connection being shown diagrammatically at the left of Fig. 1. Upon each extremity of the motor spindle, is mounted a beveled pinion 11, engaging a similar pinion 12, carried by a horizontal spindle 13. The spindles 13 are homologously positioned within the casing and serve to communicate rotation to two homologous sets of mechanism, one of which operates for each direction of travel of the car. One of the worms 14, which are mounted loose upon the spindles 13 is right-hand, and the other left-hand and they are both provided with clutches 14$^a$ adapting them to be thrown out of operation. These clutches are operated by bell crank levers 14$^b$, connecting them to the lever 6, so that when lever 6 is thrown reversing the motor, one of the worms 14 is made inoperative. The worms 14 communicate rotation to worm wheels 15, mounted on spindles 16. The spindles 16 carry also drums or reels 17 which are loose thereupon and are made to rotate by bow-shaped friction clutches 18 attached to the worm-wheels 15, as made clear in Fig. 4. Upon these drums winds the belt or web 19, which carries the names of the cross streets in their successive order. One of the worms 20 which are fast upon the spindles 13 is right hand and the other left hand. Moreover, the two worms 14 and 20 carried by each spindle are one right hand and the other left hand. The purpose of this is made clear hereinafter. Each of the worms 20 actuates a worm wheel 21, fast upon a transverse spindle 22. The spindles 22 carry also spur-pinions 23, which mesh with semi-shrouded gears 24 mounted upon transverse spindles 25. Upon each of the spindles 25 is mounted also a pulley 26, and the web 19 is conducted upon small idler pulleys 27, to the pulleys 26, between which it extends in a vertical position.

A glass window 28 provided in the front of the casing 1 permits the street names to be read upon that portion of the web 19, which extends vertically between the pulleys 26. The street names upon the web are positioned a distance apart equal to the circumference of the pulleys 26, so that when the web is properly adjusted, a street name appears in front of the window 28 for each revolution of the pulleys 26. The object in making two of the worms on the spindles 13 right hand and two left hand is that the pulleys 26 may be caused to rotate in the same direction and so that that direction of rotation will tend to carry the web toward whichever drum is winding on.

In the shroud of each gear 24, is provided a pocket, one side of which is beveled and the other cut at a right angle. Into each pocket a dog 29 pivoted at 30 is adapted to fit. Springs 31 bear upon the dogs 29 tending to retain them in their respective pockets and preventing any motion of the web when the mechanism is not in operation. The dogs 29 are provided at their pivotal ends with arms 32, giving the dogs the form of bell crank levers. Electrical contacts 33 are so positioned that when the dogs are drawn out of their respective pockets in the shrouds of the gears 24, the arms 32 make a closed electrical connection with the contacts 33. Each of the contacts 33 are connected to one of the poles of the reversing switch 5, and each of the dogs is connected to one of the motor leads. So that when the dogs are withdrawn from the pockets, electrical connection is made through the arms 32, setting the motor into operation.

A solenoid 34 is employed to actuate the dogs 29. The solenoid is provided with a soft iron core, which when current is passed through the coils is magnetized and attracts the armatures 35, one of which is attached to each of the dogs. When the dogs are drawn from their pockets, the motor is at the same time set into operation by the closing of its circuit as described. The solenoid is compound wound and is in circuit with wires 36, one of which leads to the car trucks 10 and one to the contact maker at the top of the trolley pole 9. This contact maker is pivotally mounted upon the bifurcated trolley-wheel bearing and is insulated therefrom by suitable material 37. A coiled spring 38 is attached to the contact maker and insulated therefrom, and serves to impart to it an upward impulse which is restricted by the pin 39. The contact maker is adapted to make a sliding contact with the trolley device 40, as shown in Fig. 3. A hook 41 on the top of this trolley device engages the neck of the insulator 41ª to which the trolley guy wires attach, and a bolt connects the device with the lower portion of said insulator. A switch 42 preferably to be placed upon the back platform of the car adapts the solenoid and motor circuits to be closed manually, if for any reason, they fail to close automatically at the proper time.

As the period during which the solenoid circuit remains closed will obviously be little more than instantaneous, the dogs 29 will be released immediately after being withdrawn from their pockets. Sufficient time will elapse, however, to set the mechanism into operation, so that the dogs will descend upon the face of the rotating shroud and the gears 24 will complete a revolution before the dogs again enter their pockets. It is necessary that the motor be wound for a high speed so that the impulse transmitted to the gear 24 through the train of reduction gearing during the short period when the motor circuit is closed will be sufficient to cause a complete revolution of said gears. The entrance of the dogs into the pockets in the shrouds will limit the motion of the gear 24 to one revolution.

The cylinders 43, upon which are carried the phonographic records are mounted upon transverse spindles 44. These records carry the street names in their successive order, the order of succession being the reverse upon one record of that upon the other. After each street name one or more advertisements are recorded upon the record, so that the announcement of the street will be followed by the calling out of advertising matter. Rotation is communicated to the spindles 44 by spur pinions 45 mounted thereupon and meshing with spur gears 46 carried by the spindles 22. The spur gears 46 are hidden from view in Fig. 1 by the worm wheels 21, but Fig. 4 shows one of them mounted upon its spindle.

Phonographic reproducers 47 are pivotally and slidably mounted upon transverse guide rods 48 by arms 49. A bell crank lever 50 and a link 51 attach each extremity of the lever 6 to an extremity of a transverse rod 52 passing through one of the reproducer arms 49, and adapting one of the reproducers to be thrown out of operation and the other to be made operative whenever the lever 6 is thrown, reversing the motor. The reproducers are made to travel along their records by feed screws 53; rotation is communicated to the feed screws from the spindles 44 by trains of gearing 54, 55 and 56, the latter gear being mounted on the feed screw shaft. The reproducer arms are provided with semi-circular threaded grooves adapted to engage the feed screws and feed the reproducers longitudinally along said screws. The reproducer arms slide upon the rods 48 and 52 as they travel along the screws 53. Flexible tubes 57 convey the air vibrations set up by the reproducer diaphragms to the metallic tubing 58. An outlet 59 is provided to the tubing 58 to which additional tubing 60 may be attached, conveying the air vibrations to each seat of the car. A suitable outlet 61 may be provided at each seat, so that several simultaneous announcements of each street will be made, or else one announcement may be made directly from the outlet 56 sufficiently loud to be heard throughout the car. It is intended that the lever 6 be manually reversed at the end of each trip of the car, thus reversing the direction of travel of the tape, and changing the records.

This device will not only be of service in notifying passengers of the streets, but will also acquaint new conductors with the streets upon their "run."

It is obvious that the device may be applied to cars employing a third rail instead of a trolley, by simply providing a contact device to the rail similar to the device 40, used upon the wire.

I am aware that changes may be made in the form and proportion of parts and details of the device herein-described and shown as the preferable embodiment of my invention, without departing from the spirit or sacrificing the advantages thereof, and I therefore reserve the right to make such changes and alterations in said device as fairly come within the scope of the following claims.

What I claim is:

1. In a phonographic street annunciator for an electric car, the combination with a casing and a motor inclosed therein, of contact devices fixed at intervals upon the trolley wire, a contact maker attached to the trolley-pole, and insulated therefrom, adapted to contact with said fixed devices upon the trolley and thereby close the motor circuit, a phonographic record of the names of the cross streets upon the car-line rotated by the motor, a phonographic reproducer acting upon said record, tubing conducting the sound vibrations from said reproducer to an outlet at each seat of the car, a feed screw actuating said reproducer upon the record, a web carrying the names of the cross-streets upon the car-line, drums upon which the web is wound, rotated by the motor, pulleys upon which the web turns, a window to the casing through which a street name may be read upon the web, and means whereby the rotation of the motor each time its circuit is closed is limited to the number of revolutions necessary to bring a new name upon the web before the window, and to cause the reproducer needle to traverse the same name upon the record.

2. In a phonographic annunciator for electric cars, the combination with a reversible electric motor, of contact devices fixed at intervals upon the trolley-wire, a contact maker attached to the trolley-pole and insulated therefrom, and adapted to close the circuit of said motor, two phonographic records of the cross-streets upon the car-line, rotated by said motor, the successive order of streets upon one record being the reverse of that upon the other, phonographic reproducers acting upon said records, feed screws propelling the reproducers across the records, and a reversing lever adapted to reverse the direction of rotation of the motor and at the same time throw one of the reproducers clear of its record and bring the other into contact with its record.

3. In a street annunciator for an electric car, the combination with a casing and a reversible electric motor therewithin, of contact devices fixed at intervals upon the trolley wire, a contact maker attached to the trolley-pole, and insulated therefrom, adapted to contact with said fixed devices upon the trolley, a belt or web carrying the names of the cross streets upon the car-line, in their successive order, drums loose upon their shafts, upon which the extremities of the web wind, rotated by said motor, friction clutches, fast upon the drum shafts adapted to impart rotation to said drums, mechanism whereby the drum from which the web is winding off is made inoperative from the motor, when the rotation of the latter is reversed, a window to the annunciator casing, and means whereby the operation of the motor, each time its circuit is closed is limited to the revolution necessary to bring a new name upon the web before the window.

4. In a phonographic street annunciator for electric cars, the combination with a casing, and an electric motor therewithin, of contact devices fixed at intervals upon the trolley wire, a contact maker attached to the trolley-pole, and insulated therefrom, adapted to contact with said fixed devices, and thereby close the circuit of said motor, two phonographic records of the cross streets upon the car-line, rotated by said motor, the successive order of streets upon one record being the reverse of that upon the other, phonographic reproducers acting upon said records, feed screws rotated by the motor, feeding said reproducers upon their records, a belt or web carrying the names of the cross streets in their successive order, drums loose upon their shafts, upon which the extremities of the web are wound, rotated by said motor, friction clutches fast upon the drum shafts adapted to impart rotation to said drums, pulleys about which the web turns, means whereby the travel of the web each time the motor is set into operation is limited to the distance between any two names thereupon, a window in the casing through which a street name may be read upon the web, and means whereby the motor may be reversed, the drum upon which the web is unwinding be made inoperative from the motor, one reproducer lifted from its record and the other lowered, simultaneously.

5. In an automatic, phonographic street annunciator for an electric car, the combination with contacts fixed at intervals upon the trolley-wire, and a contact device attached to the upper extremity of the trolley-pole and insulated therefrom, adapted to make electrical connection with said contact devices in passing there-beneath, of an inclosed casing, a reversible electric motor therewithin, two phonographic records of the names of cross-streets upon the car-line, in their successive order, the succession upon one being the reverse of that on the other, and rotation being imparted to both from said motor, a phonographic reproducer adapted to act upon each of said records, a rod upon which each of said reproducers is slidably and pivotally mounted, feed screws propelling said reproducers across their records, operated by the motor, tubing conducting the air vibrations originating in said reproducers, a web carrying the names of the cross-streets upon the car-line in their successive order, drums loose on their spindles, upon which wind the extremities of said web, bow springs turning with the drum spindles and frictionally engaging the drums, communicating rotation thereto, mechanism actuating the drum spindles from the motor spindle, means whereby the drum from which the web is being unwound is made inoperative from the motor shaft, a window to said casing, pulleys whereby the web is conducted before said window, wheels fast upon the pulley shafts, provided each with a pocket, pivotally mounted, spring pressed dogs adapted to catch in said pockets, and adapted when withdrawn therefrom to close the motor circuit, a solenoid adapted to be electrified by the contact of said contact maker upon the trolley and said contact device upon the trolley-wire, and adapted by its magnetism to withdraw said dogs from the ratchet slot, a lever whereby the motor is reversed and operation of the records reversed, and an auxiliary switch adapted to manually close the solenoid and motor circuits.

6. In an automatic, phonographic street annunciator for electric cars, the combination with contact devices fixed at intervals upon the trolley-wire, or its equivalent, and a contact device attached to the trolley-pole, or to its equivalent and insulated therefrom, adapted to make electrical connection with said device upon the trolley-wire, of an inclosed casing, a reversible electric motor therewithin, two phonographic records of the names of cross streets upon the car-line in their successive order, the succession upon one being the reverse of that upon the other, and advertising matter being interposed between the names of each street on the record, rotation being imparted to both records from said motor, a phonographic reproducer acting upon each of said records, a rod upon which each of said reproducers is slidably and pivotally mounted, feed screws propelling said reproducers across their records, operated by the motor, tubing conducting the air vibrations originating in said reproducers, a web carrying the names of the cross streets upon the car line in their successive order, drums loose on their spindles upon which are wound the extremities of said web, friction clutches fast upon the drum spindles bearing upon the drums and communicating rotation thereto, a window to said casing containing the annunciator mechanism, pulleys whereby the web is conducted before said window, wheels fast upon the pulley shaft, provided each with a ratchet pocket, pivotally mounted dogs engaging in said pockets and adapted when withdrawn therefrom to close the circuit of said motor, a solenoid adapted to be electrified by the closing of its circuit when the contact devices upon trolley-pole and trolley-wire come together, and adapted when electrified to magnetically withdraw said dogs from their pockets, and means whereby the motor is reversed, one reproducer is made inoperative and the other put into operation, and the communication of rotation from the motor to one of said drums is interrupted.

7. In a phonographic annunciator for electric cars, the combination with a reversible electric motor, of contact devices fixed at intervals upon the trolley-wire, a contact maker attached to the trolley-pole and insulated therefrom, adapted to close the circuit of said motor, two phonographic records of the cross streets upon the car line, the successive order of the streets upon one record being the reverse of that upon the other, rotation being imparted to said records by the motor, phonographic reproducers acting upon the records, feed-screws propelling the reproducers across the records, tubing conducting the sound vibrations from the reproducers to each seat of a car, and a reversing lever adapted to reverse the direction of rotation of the motor, and at the same time to throw one of the reproducers clear of its record, and bring the other reproducer into contact with its record.

In testimony whereof I have signed my name to this specification in the presence of two subscribing witnesses.

RICHMOND M. McGEE.

Witnesses:
 JOHN S. MURRAY,
 JESSIE KIRK.